United States Patent [19]

Nakajima

[11] Patent Number: 4,578,140

[45] Date of Patent: Mar. 25, 1986

[54] CASSETTE TYPE LABELER AND CASSETTE CASE

[75] Inventor: Toshio Nakajima, Tokyo, Japan

[73] Assignee: Teraoka Seiko Co., Ltd., Tokyo, Japan

[21] Appl. No.: 398,901

[22] Filed: Jul. 16, 1982

[30] Foreign Application Priority Data

| | | | |
|---|---|---|---|
| Jul. 21, 1981 | [JP] | Japan | 56-114078 |
| Jul. 29, 1981 | [JP] | Japan | 56-118996 |
| Aug. 5, 1981 | [JP] | Japan | 56-122684 |

[51] Int. Cl.$^{4}$ .................... B32B 35/00

[52] U.S. Cl. .................... 156/384; 156/510; 156/540; 156/541; 156/579; 156/584

[58] Field of Search .............. 156/541, 542, 384, 579, 156/584, 361, 510; 101/288, 291, 292; 352/72, 78 R

[56] References Cited

U.S. PATENT DOCUMENTS

| | | | |
|---|---|---|---|
| 3,767,098 | 10/1973 | Pabodie | 226/117 |
| 3,817,177 | 6/1974 | Arnam et al. | 156/384 |
| 3,823,808 | 7/1974 | Murata | 197/133 R |
| 3,944,455 | 3/1976 | French | 156/542 |
| 3,951,061 | 4/1976 | Bremmer | 101/93.12 |
| 4,036,132 | 7/1977 | Ellefson | 101/288 |
| 4,073,234 | 2/1978 | Sato | 101/288 |
| 4,120,245 | 10/1978 | Karp et al. | 101/288 |
| 4,207,131 | 6/1980 | Hamisch, Jr. | 156/384 |
| 4,253,902 | 3/1981 | Yada | 156/584 |
| 4,264,396 | 4/1981 | Stewart | 156/361 |
| 4,375,189 | 3/1983 | Berner | 101/68 |
| 4,385,958 | 5/1983 | Long | 156/384 |
| 4,407,692 | 10/1983 | Torbeck | 156/350 |
| 4,440,592 | 4/1984 | Sato et al. | 156/384 |

FOREIGN PATENT DOCUMENTS

| | | |
|---|---|---|
| 56-114078 | of 0000 | Japan . |
| 56-122684 | of 0000 | Japan . |
| 56-118996 | of 0000 | Japan . |
| 54-16400 | 2/1979 | Japan . |

*Primary Examiner*—Caleb Weston
*Attorney, Agent, or Firm*—Sandler & Greenblum

[57] ABSTRACT

A novel handy labeler, and more particularly a handy machine for labelling is provided, which is called also as a price gun, label gun, pricer or labeler, and is used to fasten labels containing information on prices, commodity names, dates etc., to food articles and clothes, by workers at supermarkets, department stores and so on. Further, there are provided a cassette case which stores labels, and a label printer for printing labels and for winding and housing base sheet to which printed label is affixed, in the cassette case.

61 Claims, 40 Drawing Figures

CASSETTE TYPE LABELER AND CASSETTE CASE

FIELD OF THE INVENTION

This invention relates to a handy labeler, more particularly to an improvement in a handy machine for labelling, which is called also as a price gun, label gun, pricer or labeler, and is used to fasten labels containing information on prices, commodity names, dates etc., to food articles and clothes, by workers at supermarkets, department stores and so on. Further, the invention relates to a cassette case which stores labels, and to a label printer for printing labels and for winding and housing base sheet to which printed label is affixed, in the cassette case.

DESCRIPTION OF THE PRIOR ART

The conventionally used handy labeler is constructed such that a labelled base sheet in a form of a roll wounded around a paper tube or the like, is feeded from a roll housing to a printing section so that particulars such as prices may be printed in the section, and that, thereafter the roll is feeded to a peeling section in order that the label is peeled off from the base sheet. The base sheet from which the label is peeled off, is wounded again in such a manner that the label is moved forward to a desired direction.

In other words, the labeler contains a label housing, a label guiding section, a label printing section and a label peeling section. Consequently, the labeler itself is very heavy. Furthermore, works are required for incorporating information to be printed into the labeler, and for printing. In addition, a delicate or elaborate mechanism is necessary for feeding or guiding the labelled base sheet in order through a housing, a guide, a printing section, a peeling off section and a driving section for feeding the base sheet. Consequently, a complicated adjustment operation should be effected so that correctly printed labels are feeded and fastened to commodities.

Japanese examined patent publication No. 54-16400 discloses a labeler to which a roll of labelled base sheet is easily mounted. In this labeler, labelled tape is printed by a printer while it is feeded by operation of an operation lever, in the course between the outlet of a tape housing and a peeling base for peeling off the label. Accordingly, a portion is necessary in the tape feeding course so that printing work can be carried out. No substantial improvement in simplification is effected for this labeler, in the way for feeding the tape through the outlet of the labelled tape housing, a wheel for feeding out the tape, a printer, a peeling base, although a work for setting the labelled tape to a labeler is simplified by the use of an improved labelled tape housing.

As explained above, conventional labelers have a printing section so that information data is printed on the labeler immediately before the label is produced out from the labeler. The structure mentioned above, however, has drawbacks that a complicated operation is necessary for setting the input information such as prices into the printer, that the operation is inefficient and is liable to make errors. Further, since the rubber-made printing points are operated manually, it occurrs sometimes that letters are not printed evenly or uniformly if uniform operative power is not applied, and that defected labels are produced due to dusts introduced into a printing drum. In this way, the conventional labelers are sufferred from drawbacks that letters or figures do not appear uniformly due to uneven printing effected in the labeler.

SUMMARY OF THE INVENTION

One of the objects of the invention is to provide an improved cassette type labeler in which a cassette case can be easily incorporated into the labeler body, wherein the cassette case stores base sheet which carries printed label, and wherein the case is provided with a peeling member for removing labels from the base sheet so that the sheet may be taken up by the labeler.

Another object of the invention is to provide a cassette type labeler which is light-weighted and which is improved in workability. That is, it is an object to provide a structure which needs no printing mechanism so that the labeler may be light-weighted and that the data-setting work of the complicated information for printing may be avoided. In other words, it is an object to provide a structure in which information data has been printed prior to the time the label is feeded through the labeler so that letters and figures are evenly, correctly and well readably printed and that, thus, well printed label may be obtained.

The third object of the invention is to provide a cassette case which can be used to the cassette type labeler of the invention.

The fourth object of the invention is to provide a handy and improved labeler consisting of a labeler body in which the labelled base sheet is smoothly feeded and the peeled off label can be fastened to commodities without fail; and of a cassette case which can be mounted to the labeler body by an easy operation.

The fifth object of the invention is to provide a label printer for winding and housing printed label into the cassette case.

The cassette type labeler of the invention is characterized in comprising; a cassette case which stores base sheet provided thereon with previously printed label (labelled base sheet), and which has a peeling member at its outlet opening so that the base sheet may be curved so as to peel off the label; and of a labeler body to which the cassette case is mounted, and works to feed the base sheet intermittently.

The cassette case of the invention is characterized in being provided with an opening from which the labelled base sheet is extracted; a peeling member near the opening, which acts to bend the feeded sheet to the rearward so as to peel off the label from the base sheet; and a guide member to feed the peeled-out base sheet to a desired direction.

The label printer of the invention, for printing labels feeded one after another, is characterized in consisting of an input unit for supplying a central processing unit with information data; a printing mechanism for printing the label on the basis of the control by the central processing unit; and a labelled base sheet-feeding mechanism for feeding the base sheet; and in that the cassette case is mounted to a mount frame provided near the feeding mechanism (feeder) so that the base sheet provided with printed label, is wounded and housed into the case in synchronism with the feeding movement of the feeder.

BRIEF DESCRIPTION OF THE DRAWINGS

FIG. 38 is a side sectional view, partially in section, of the cassette case to which labelled base sheet is wounded and stored in;

DESCRIPTION OF THE PREFERRED EMBODIMENTS OF THE INVENTION

Figure 1:
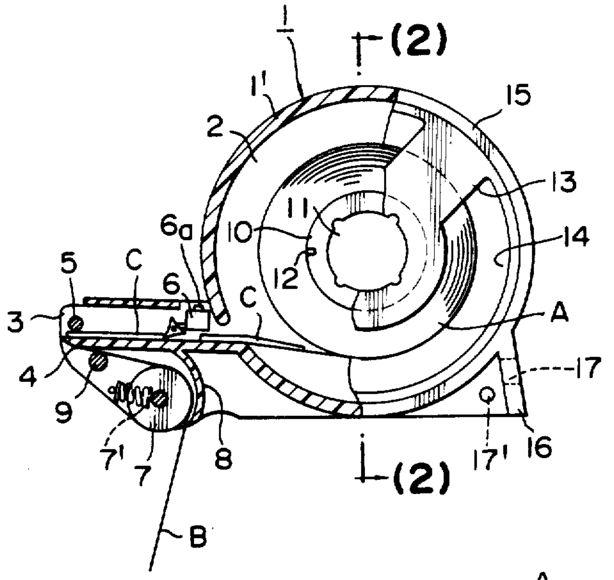
FIG. 1 is a side view, partially cut out, of a part of the cassette case of the invention.

FIG. 1 illustrates a cassette case 1 which is used for the labeler of the invention. The cassette case 1 is so constituted that a labelled base sheet of a roll form is drawn out from a housing 2, through an opening 3. A peeling plate 4 is provided near the opening 3, for peeling a label C on which information data has already been printed, from its base sheet, while a set roller 5 is provided to face to the peeling plate 4. A reversible counter 6 is provided in the course between the housing 2 and the opening 3, so as to detect a gap or uneven portion between each of the labels C or the base sheet B and, thus, to count the number of labels passed. The counter 6 can make a reduction counting as well as an addition counting. It has a clear off button 6*a* by which the number appeared in an indicator returns to zero.

A feeding roller 7 is provided behind the peeling plate 4, so as to feed the base sheet B curved by the plate 4 and the roller 5 to a predetermined tangential direction. A guide member 8 covers the feed roller 7 so as to guide the base paper B. Further, a position-setting pin 9 is provided near the peeling plate 4, so that the case 1′ may be set to a labeler body which will be explained later.

A rotatable supporting shaft 10 is provided at the center position of the housing. The shaft 10 supports or carries labelled base sheet A, and has a set hole 11. A slit 12 is provided at the circumference of the shaft 10 so as to stop the roll end of the labelled base sheet A. One side of the housing 2 may be provided with an openable cover 13 (of a transparent material so that the amount of the labelled base sheet A may be checked). Further, a mounting plate 16 having a setting hole 17, is set to the circumference 15 of the housing 2.

The reference number 7′ indicates a spring for pressing the feed roller 7 toward a guide member 8, and the number 17′ is a position setting hole.

Figure 2:
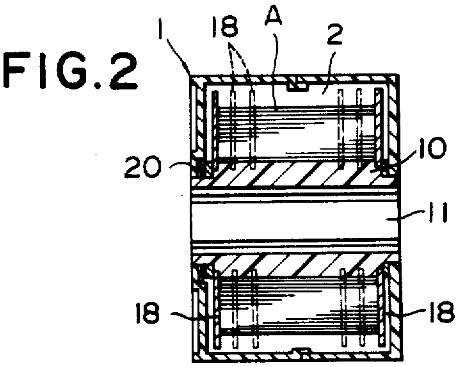
FIG. 2 is a sectional view along the line (2)—(2) of FIG. 1.
Figure 3:
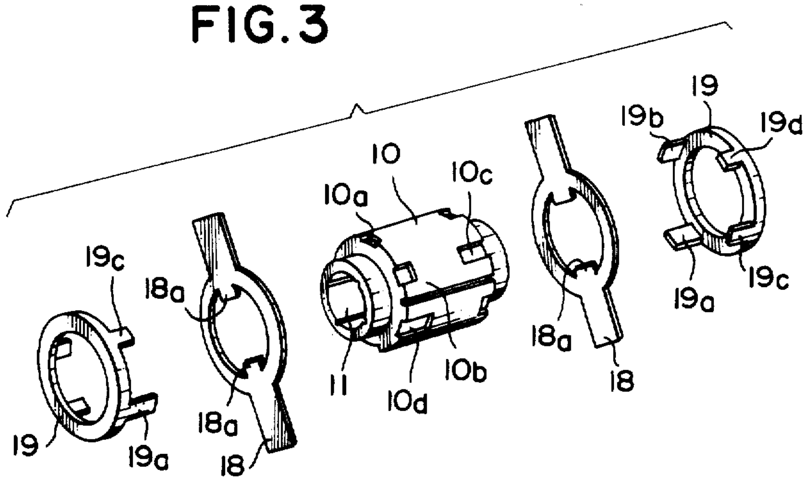
FIG. 3 is a perspective view showing parts constituting a supporting shaft for supporting or carrying the labelled base sheet.

FIGS. 2 and 3 illustrate a structure of a supporting shaft 10 which supports a labelled base sheet A. The shaft 10 of this embodiment has four kinds of position-setting grooves 10*a* through 10*d* of different lengths, at their both ends. Fitting projections 18*a* of two roll setting plates 18, 18 are fitted in either pair of grooves 10*a* through 10*d*. After a labelled base sheet A is positioned between the two plates 18, set pieces 19*a* through 19*d* of a pair of set collars 19 are fitted in any of the position-set-grooves 10*a* through 10*d* so as to fix the roll set plates 18. The size of the base sheet B can be changed by selecting the combination of the set pieces 19*a* through 19*d* and of the position set grooves 10*a* through 10*d*.

In FIG. 2, a reference number 20 is a plate spring positioned between a cassette case 1 and a set collar 19, and acts to hold the set plate 18 in position. Further, the spring 20 applied friction power onto the supporting shaft 10 so that the labelled base sheet A may not get loose due to any shock or vibration.

The cassette case 1 is mounted to a manual type or electro-motive labeler body.

Figure 4:
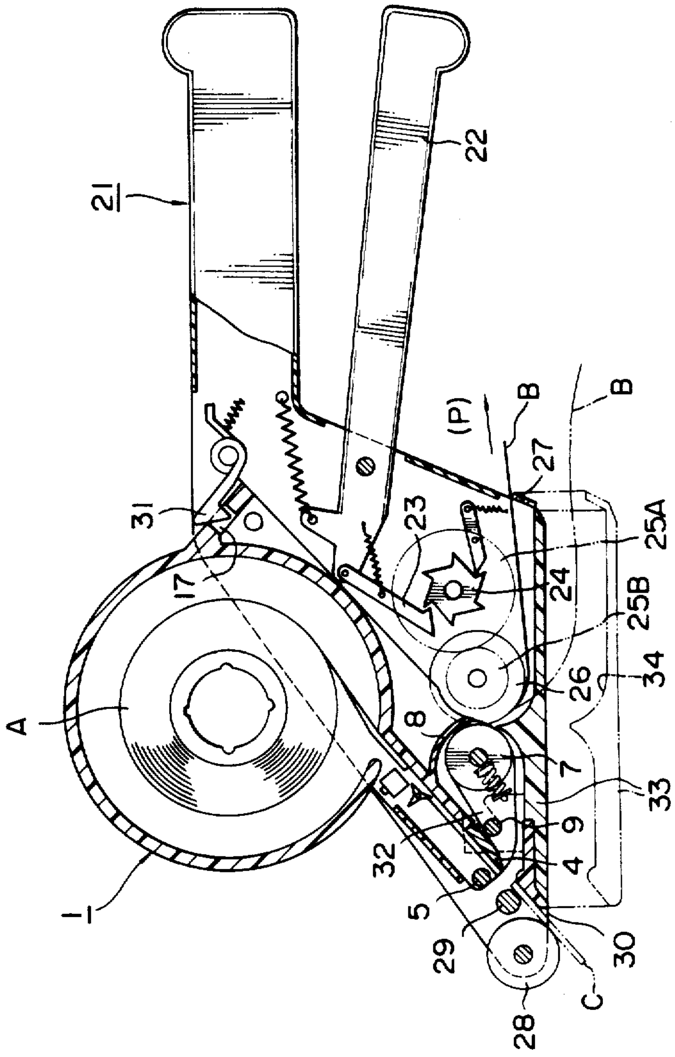
FIG. 4 is a side view, partially cut out, of the labeler to which the cassette case is mounted.

FIG. 4 illustrates an example of a manual labeler body 21 to which the cassette case 1 is removably mounted. With a manual operation (or electro-motive operation if desired) of the body 21, labels C are taken out one by one from the cassette case 1 and are sticked or fastened onto commodities. In operation, as seen in FIG. 4, a cassette case 1 is first mounted to the body 21 and an operation lever 22 is gripped. As a result of gripping, a ratchet claw 23 let a ratchet gear 24 rotate one point. The rotation of the ratchet gear 24 is transmitted via an intermediate gear 25A to a driving roller 26. Consequently, the base sheet B holded between the driving roller 26 and a feeding roller 7 which feeds the sheet B to a desired direction, moves forward by frictional power to the direction indicated by an arrow P.

A part of the driving roller 26 (or its cooperative member) may be formed into a sprocket so that a labelled base sheet A prior to the time it reaches a peeling plate 4, or a base plate B may engage with its feeding hole, so as to reliably carry out the intermittent feeding. A portion of the base sheet B projected from a cutter 27, is cut down.

Figure 5:
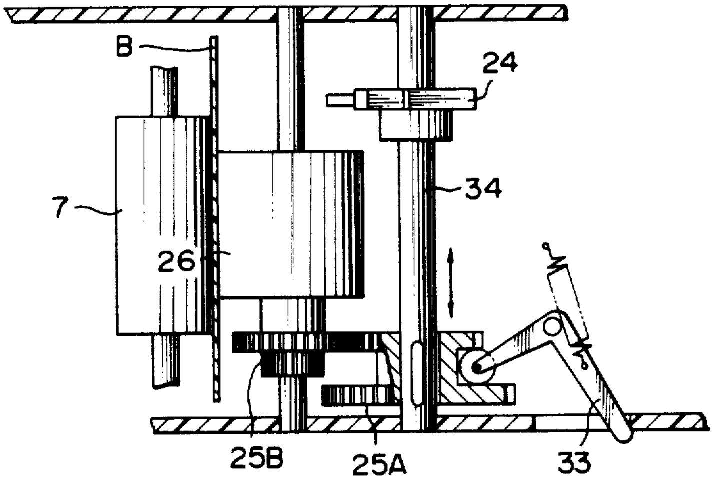
FIG. 5 is a view for illustrating the gear ratio of intermediate gears in the labeler.
Figure 6:
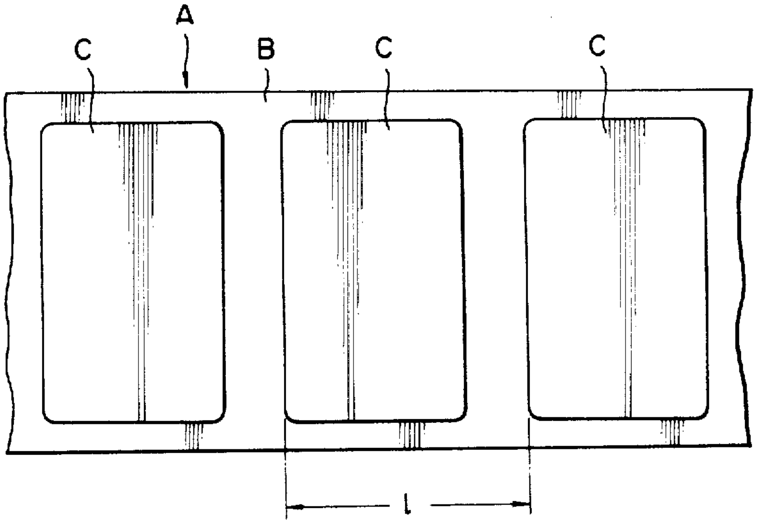
FIG. 6 is plan view for illustrating the size of label provided on a base sheet.

The gear ratio can be changed in two stages (or three stages). That is, as will be seen in FIG. 5, by moving a change lever 33 along the gear shaft 34, either of intermediate gears 25A, 25B is operated. Consequently, in a case a new label C is used (FIG. 6) of which size (l) is different from a former one, a smooth gear change can be carried out.

Simultaneously with the feeding of the base sheet B, the label C is peeled off at the edge of the peeling plate 4, and is projected from under the fastening roller 28 as shown in dotted line 4 in FIG. 4. The label C is forwarded substantially straightly under the roller 28 through a route between a peeling plate 4 and a retainer roller 5, and between label accepting (receiving) shaft 29 of a labeler body 21 and a label accepting (receiving) plate 30. The label C thus projected from the labeler body 21, is fastened to objected commodities.

In this way, by every gripping motion of the operating lever 22, a new label C is feeded from the cassette case 1 and is sticked to a commodity. The number of used label C (or the remaining label) is indicated in a counter 6.

A change of a labelled base sheet A is effected as follows. A stop hook 31 is unfasten from a set hole 17 of the cassette case 1. Then a position-set-pin 9 is pulled out from a position-set-groove 32 (if the position-set-pin 9 is used as the position-set-groove, the groove 32 act is as a position-set-pin), so that the cassette case 1 is removed from the labeler 21.

A new cassette case 1 is mounted to a labeller body 21 as follows.

A base sheet B is projected from a feeding roller 7 and a guide member 8, and a top of the label C is positioned at a retainer roller 5. Then a bottom cover 33 of the labeler body 21 is opened as shown in a dotted line of FIG. 4. After the position-set-pin 9 is inserted into the position-set-groove 32, the stop hook 31 is hooked to the set hole 17 so as to fix the cassette case 1, and the bottom cover 33 is closed. The base sheet B which has been projected between the feeding roller 7 and the guide member 8, is thus positioned along the guide face 34 of the cover 33, as shown in full line of FIG. 4. After the cassette is fixed to the labeller 21, the label C is peeled off from its base sheet by gripping the operating lever 22, as mentioned.

For placing a new labelled base sheet into the cassette case 1, either way of the following two methods is adopted.

(i) A rolled base sheet A which is provided with a printed label (labelled base sheet) is set into a housing 2 in a manner that its roll end is positioned at the outlet opening 3, and that the base sheet B is projected from between the feeding roller 7 and the guide member 8. Then the housing 2 and the opening 3 are closed by a cover 13.

(ii) The starting end of the roll of the labelled base sheet A is inserted into a slit 12 of a supporting shaft 10. A driving shaft is pushed into a set hole 11 so that the labelled base sheet A may be wounded therearound. Then a base sheet C is projected from between the feeding roller 7 and the guide member 8. Since the number of the label C is indicated in the counter 6, it is possible to store a required number of labels C in the housing 2. An auto-loading mechanism may be provided to the supporting shaft 10.

FIGS. 7 through 25 show combinations of various cassette cases and labeler bodies of the invention. In these drawings, a reference number 100 indicates a cassette case, 150 is a labeler body, A' is a labelled base sheet, B' is a base sheet, C' is a label.

The cassette case 100 has a housing 102 inside its case body 101, so that a labelled base sheet A' is wounded around a rotable supporting shaft 110 provided in the housing 102. An end of the labelled base sheet A' is positioned to be drawn out from an outlet opening 103 provided at the front position of the case body 101. Near the opening 103 are provided a peeling shaft 104 and a set roller 105. The labelled base sheet A' is curved by means of the peeling shaft 104, toward the rearside of the shaft 104 and, accordingly, the label C' is peeled off from the base sheet B'. The peeling shaft 104 may be rotatable or stable.

The structure mentioned above, is substantially identical to that for the previously mentioned cassette case 1. In the drawings, a reference number 106 indicates a guide roller, 111 is a stop hole provided in a supporting shaft 110, 112 is a slit for stopping the roll start of the labelled base sheet A'.

The case body 101 consists of a front case **101*a* in which a front opening 103, a peeling shaft 104, a set roller 105, a guide roller 106 and a supporting shaft 110 are provided, and a rear case 101*b* which covers the rearside of said front case 101*a*. The two case members 101*a* and 101*b* are fixed to each other by a hinge 107, and form the housing 102**.

Figure 7:
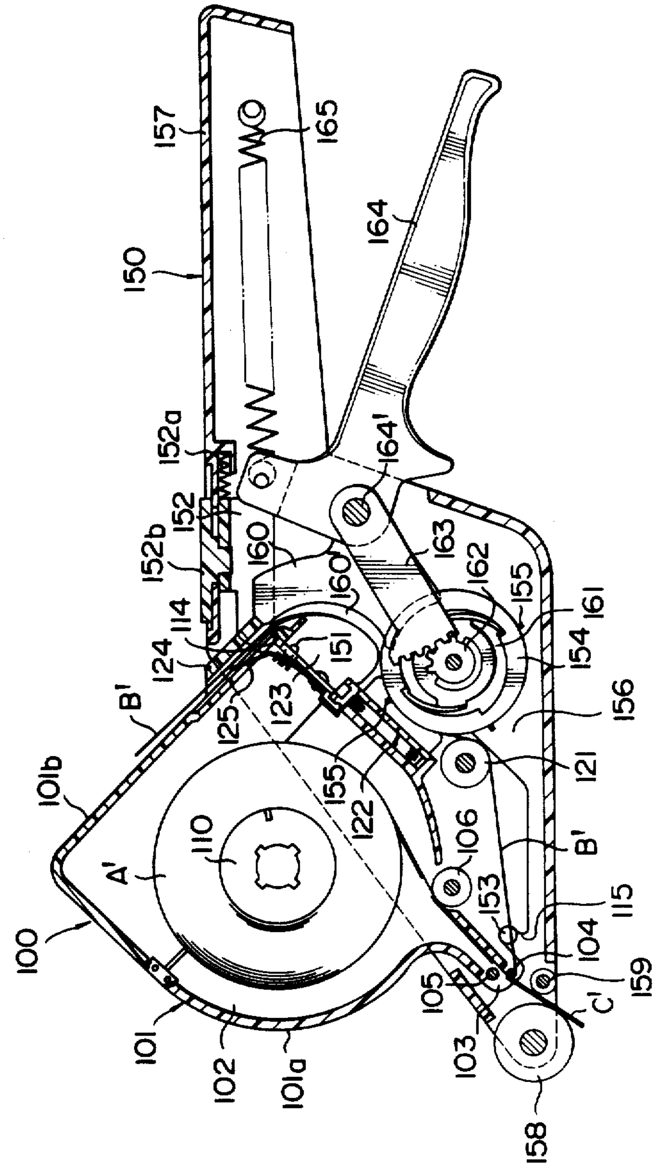
FIG. 7 is a side sectional view of another embodiment of the labeler according to the invention.
Figure 8:
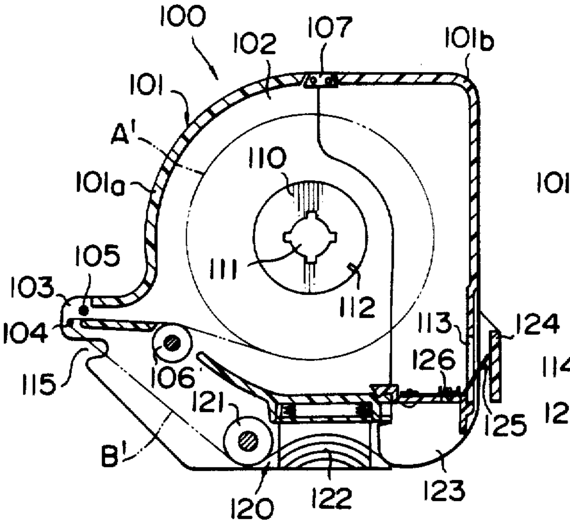
FIG. 8 is a side sectional view of the cassette case taken along the line (8)—(8) of FIG. 9.
Figure 9:
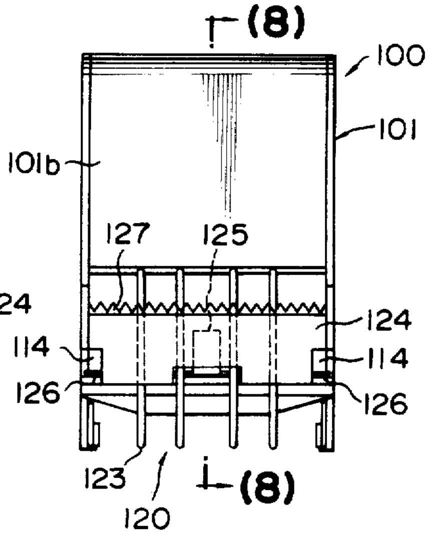
FIG. 9 is a back view of the cassette case.

The cassette case 100 has, as will be seen from FIGS. 7 through 9, a guide roller 121, as sheet allowing (accepting) member 122 and a guide plate 123 at the rearside of the peeling shaft 104, i.e. at the rear bottom of the case body 101, and a guide frame 124 at its lower back portion. With such a structure, a base sheet B' is bended by the peeling shaft 104 toward the rear side of the shaft 104, and guided to a predetermined direction along said members 121, 122, 123 and 124.

The above mentioned members 121, 122, 123, 124 form, in combination, a guide 120 for the base sheet B', while a guide frame 124 together with a sheet-set-plate 125 mentioned later, constitute a sheet stop mechanism.

The guide roller 121 and the sheet accepting member 122 are provided at the bottom of the front case 101*a*, while the guide plate 123 and the guide frame 124 are formed in the rear case 101*b*. The guide plate 123 is inclined so that the base sheet B' may be smoothly guided from the sheet accepting member 122 to the guide frame 124. The guide plate 123 consists of plural number of plates in order to decrease the friction to the base sheet B'.

The guide frame 124 need not necessarily be provided at the back portion of the case body 101. If desired, the guide frame 124 may be formed at the position of the guide plate 124. The guide frame 124 is projected from the lower back portion of the rear case 101*b*, so that the base sheet B' goes through the space between the plate 124 and the rear case 101*b*.

The rear case 101*b* has a hole 113 at the center portion facing to the guide frame 124. An end of the sheet-set-plate 125 is fixed to the frame 124 while the other end is fixed to the inside surface of the case 101*b* through the hole 113.

Figure 10:
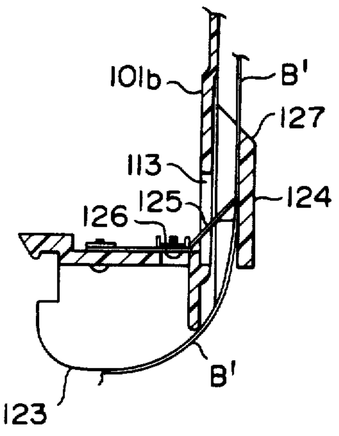
FIG. 10 is an enlarged view of a guide frame which constitute a temporary stopper of a base sheet, provided for the cassette case.
Figure 11:
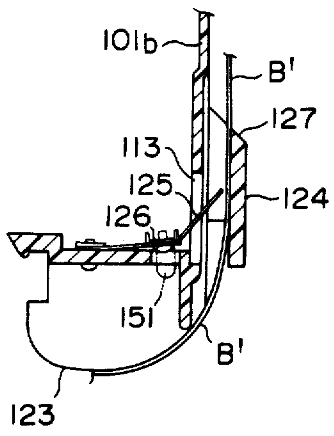
FIG. 11 is an enlarged view of a guide frame for the cassette case shown in FIG. 7.
Figure 12:
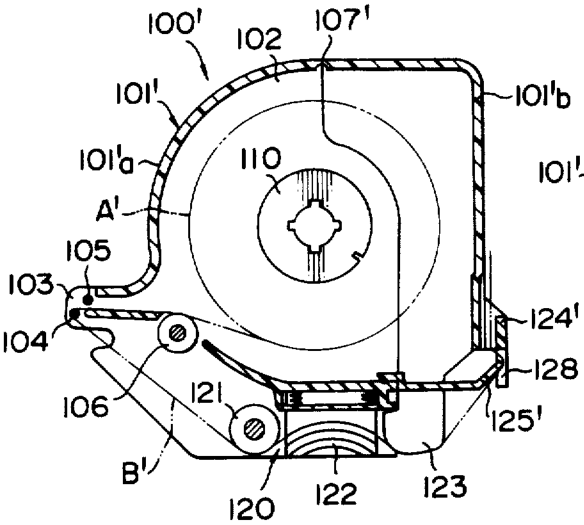
FIG. 12 is a side sectional view along the line (12)—(12) of FIG. 13, of an another embodiment of the cassette case of the invention.
Figure 13:
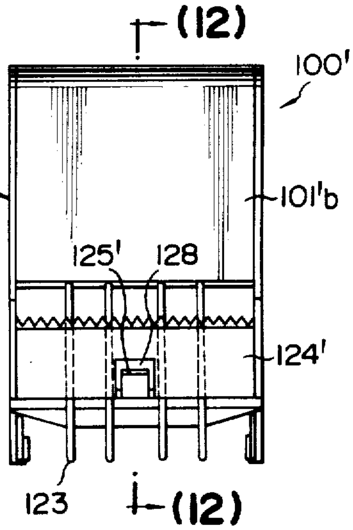
FIG. 13 is a back view of the cassette case shown in FIG. 12.
Figure 14:
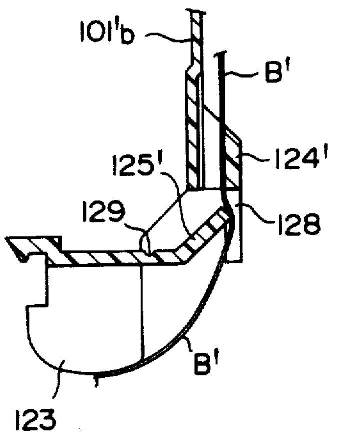
FIG. 14 is an enlarged view of the guide frame of the cassette case shown in FIG. 12.
Figure 15:
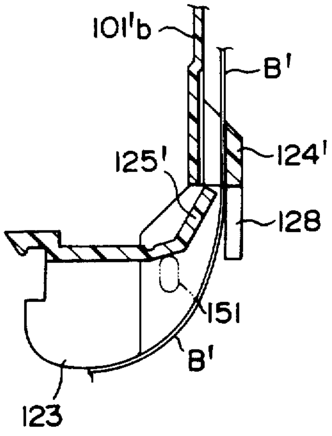
FIG. 15 is an enlarged view of the guide frame similar to FIG. 14, but at the stage where the cassette case is mounted to the labeler body.

The set-plate 125 is formed of a plate spring which can spring up. Due to the springing movement, the plate end can touch or detouch the guide frame 124 (FIGS. 10 and 11). That is, the plate 125 holds the base sheet B' springingly onto the guide frame 124 (FIG. 10) while the base sheet B' is released when the plate 125 springs off from the guide frame 124 (FIG. 11). Thus, the guide frame 124 and the sheet-set-plate 125, in combination, act as a sheet stop mechanism.

The set-plate 125 has a push arm 126 which projects to both sides. The back case 101*b* is provided with cut holes 114, 114 which face to the ends of the arm 126, so that the ends of the arm 126 project through the holes 114, 114.

When the case 100 is mounted to a labeler body 150, a knock pin 151 of the body 150 goes through the holes 114, 114 so as to collide with the arm end 126, and thus to raise the set plate 125. In consequence, the plate 125 detaches from the guide frame 124. Accordingly, the base sheet B' is released.

The holes 114, 114 act in cooperation with a lock arm 152 provided movably to the body 150, as a mechanism for locking the cassette case 100 to the body 150.

The front case 101*a* has a cut out recess 115 at its front end, so that a pin 153 of the labeler body 150 may fit into the recess to fix the case.

The guide frame 124 is provided at its upper end with a cutter 127 so that the base sheet B' feeded from the frame 124 is cut down. The cutter 127 may be formed integral with the frame 124 or separately.

FIGS. 12 to 15 illustrate a cassette 100' which is a variation of the cassette 100 described above. The cassette 100' comprises a case body 101' which is composed of a front case 101'*a* and rear case 101'*b* which are integrally molded from polypropylene resin or other material, and also comprises a guide frome 124' and base-sheet set plate 125' which are integrally molded.

The junction of the front case 101'*a* and rear case 101'*b* is provided with a thin portion or a bent or curved portion, where a hinge 107' is provided for enabling the two cases 101'*a* and 101'*b* to be opened and closed.

The guide frame 124' is provided with a window 128, and the bottom wall of the rear case 101'*b* is partially projected into the window 128 to form a set plate 125'.

The above-mentioned set plate 125' is provided with the function of a leaf spring for elastically rising and falling, by such a means as forming a recess 129 near the non-loose end of the plate so that, while the set plate 125' is in the state of projecting into the window 128, the set plate 125' and window 128 may co-work so as to hold the base sheet (B') between them and may release the base sheet (B') from being thus held as the set plate 125' separates from the window 128.

The above-mentioned base sheet (B') is provided with holes (b, b, . . . ) at constant intervals so that the holes (b, b, . . . ) may engage with the feed claws 155 of the sprocket 154 in the main body 150.

Figure 19:
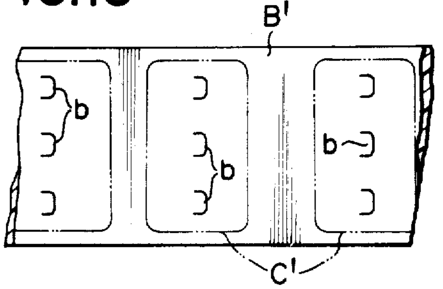
FIG. 19 is a bottom view of the base sheet.

The holes (b, b, . . . ) need not be shaped round but may be slit in the form of a U as in FIG. 19, and also need not be in one row but may be two or more rows. with the base sheet (B') provided with the slits (b, b, . . . ) as in FIG. 19 under labels (C', C', . . . ), when a label (C') peels off, the U-slit portions turn up to form holes in the base sheet.

The main body 150 of the labeler has in the front a cassette containing portion 156 whose front is open, and also has a grip 157 projecting rearward. At the front bottom of the main body 150, a labeling roller 158 and label-receiving roller 159 are rotatably provided front and back with an appropriate space between them. In the above-mentioned cassette containing portion 156 of the labeler main body 150, the aforementioned locking rod 152 is provided at the top so as to be able to project horizontally, and a dowel pin 151 is projected near the bottom of the locking rod 152. At the front bottom of the cassette containing portion 156, a supporting pin 153 is projected laterally.

The above-mentioned locking rod 152 is provided with a spring 152*a* to energize the rod 152 for moving forward, and a lock release 152*b* is projected above the grip 157.

The above locking rod 152 and supporting pin 153 compose a lock mechanism to support and fix in the cassette containing portion 156 a cassette 100 which is set on the labeler main-body 150.

As the cassette 100 is pushed, with the guide member 120 faced downward, into the cassette containing portion 156 of the labeler main-body 150, the back of the case body 101 moves back the locking rod 152 against the elastic force of the spring 152*a*. When the rod 152 reaches a position in which the rod 152 opposes the cutout hole 114 of the case body 101, the elastic force of the spring 152*a* causes the rod 152 to move forward into the cutout hole 114, and the supporting pin 153 engages with the cutout 115 of the case body, for thereby preventing the cassette 100 from coming out and for holding the cassette 100 in a loaded state.

By pulling the above-mentioned lock release rearward to move back the locking rod 152 for thereby letting the rod 152 come out of the cutout hole 115, the cassette 100 can be extracted from the cassette containing portion 156.

The cassette 100 can therefore be freely set in and separated (detached) from the labeler main body 150.

The aforementioned dowel pin 151 pushes up, when the cassette 100 is set in the cassette containing portion 156 as above, the arm 126 of the base-sheet set plate through the bottom of the cutout hole 114 of the case body 101, and this causes the set plate 125 to separate from the guide frame 124 and releases the base sheet (B') from being held, enabling the base sheet (B') to be sent out.

The cassette containing portion 156 is provided with the aforementioned sprocket 154, which is rotatably borne at the position opposite to the sheet receiving member 122 of the cassette 100 set in the cassette containing portion 156, and is also provided with a main-body-side guide 160 at the position opposite to the guide plate 123.

The sprocket 154 is arranged so as to let the base sheet (B') be inserted between the sprocket 154 and the above-mentioned sheet receiving member 122 and to have the feed claws 155 of the rotating sprocket 154 engage with the holes (b) made in the base sheet (B'), and the rotation of the feed claws engaging with the holes (b) carries out the operation to send out the base sheet (B').

The main-body-side guide 160 has a curved face corresponding to the curved shape of the aforementioned guide plate 123 to form a guide path 160' between them 123 and 160 for leading the base sheet (B') toward the guide frame 124. By the intervention of this main-body-side guide 160, the base sheet (B') having passed the sheet receiving member 122 is securely sent toward the guide frame 124, and even in case, for example, that the cassette 100 is set in the labeler main-body 15 in the condition that the tip of the base sheet (B') is positioned immediately after the sheet receiving member 122, or that the base sheet (B') is cut before the guide frame 124, the tip of the base sheet (B') can be led into the guide frame 124 through the above-mentioned guide path 160'.

The aforementioned sprocket 154 is connected with a gear 162 via a one-way clutch 161 so that the sprocket 154 may be rotated only in the direction in which the base sheet (B') is carried rearward, and one end of a driving arm 163 on which the teeth to engage with the gear 162 are formed is rotatably provided on a lever shaft 164'.

One end of a lever 164 is fixed to the above-mentioned driving arm 163, and the top of the arm 163 is provided with a spring 165 to project the lever 164 to below the grip 157.

Therefore, as the labeler user holds the grip 157 of the labeler main-body 150 by hand and moves up the lever 164 by clenching it, the sprocket 154 turns clockwise as viewed as in FIG. 7. This causes a fixed length of the base sheet (B') is sent out by the feed claws 155; therefore, the base sheet with labels (A') in the cassette 100 is drawn out, a label (C') peeled off the base sheet (B') is let out into the opening 103 of the case body 101 and is held between the rollers 158 and 159 to be ready for attachment to a target place.

As the lever 164 clenched as above is released to move downward, the driving arm 163 and gear 162 move back, but the sprocket 154 does not rotate because of the intervention of the one-way clutch 161.

The above-mentioned one-way clutch 161 may alternatively be arranged to be driven in the opposite direction so that the sprocket may turn to issue a label (C') when the lever 164 moves down.

The above-described cassette 100 can be set for immediate issue of a label simply by inserting the case body 101 into the cassette containing portion of the labeler main-body 150, and is removable by releasing the lock by operating the lock release 152*b* of the locking rod 152. Since the cassette 100 holds the base sheet (B') between the guide frame 124 and set plate 125, the base sheet (B') does not hang but is kept along the guide member 120; therefore, the cassette 100 is not only easy to set in the labeler main-body 150 but also convenient to carry. The above is similarly applicable to the cassette 100' illustrated in FIGS. 12 to 15 as well.

Next the aforementioned sheet receiving member 122 provided for smooth engagement of the feed holes (b) of the base sheet (B') and the feed claws 155 of the sprocket 154 each other in using the labeler after setting the cassette 100 or 100' in the labeler main-body 150 will be described in detail.

Figure 16:
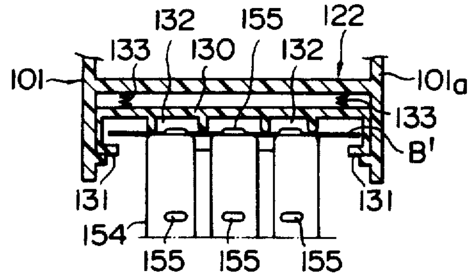
FIG. 16 is a sectional view of the base sheet feeder for the labeler along the line (16)—(16) of FIG. 7.
Figure 17:
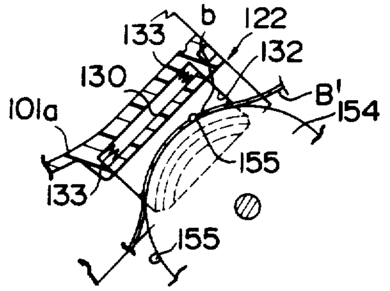
FIG. 17 is a side sectional view of the base sheet feeder shown in FIG. 16.
Figure 20:
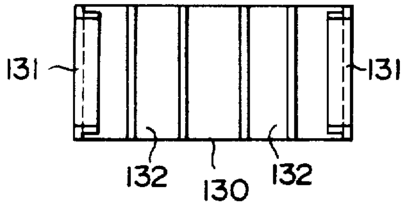
FIG. 20 is a bottom view of a sheet accepting member.
Figure 18:
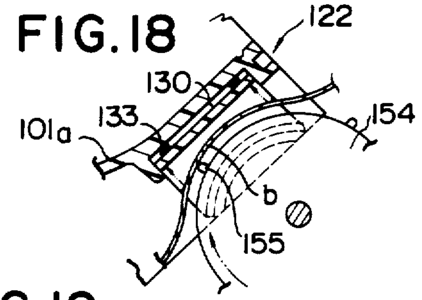
FIG. 18 is a side view illustrating the base sheet feeding movement.

As shown in FIGS. 16 to 18, the sheet receiving member 122 is composed of a sheet receiving plate 130 and right and left side plates 131 and 131. The receiving plate 130 is shaped to be in the form of a curved face along the circumferential face of the aforementioned sprocket 154, and the curved face is provided with grooves 132 to let the feed claws 155 escape through them. The side plates 131, 131 are projecting in the form of an L from the right and left side edges of the receiving plate 130.

The sheet receiving plate 130 is fixed to the case body 101, more particularly to the bottom face of the front case 101*a*, to be detachable and to be able to slide up and down, and coiled springs 133 are provided between the receiving plate 130 and front case 101*a* in order to energize the receiving plate 130 toward the sprocket 154.

The right and left side plates 131, 131 are arranged with such a space between them as to touch the right and left side edges of the base sheet (B') which is along the bottom of the receiving plate 130, for positioning in the lateral direction the base sheet (B') which runs under the receiving plate 130, so that the feed holes (b) of the base sheet (B') may be positioned on the tracks through which the feed claws 155 of the sprocket 154 rotate.

By the intervention of the above-mentioned coiled springs 133, the receiving plate 130 elastically touches and separates in the direction of the sprocket 154, exerting a spring function between the base sheet (B') running under the receiving plate 130 and the feed claws 155 of the sprocket 154.

Even if the holes (b) of the base sheet (B') do not engage with the feed claws 155 of the sprocket when the cassette 100 is set in the labeler main-body 150, because the spring function causes the base sheet (B') to move up elastically together with the receiving plate 130 at the time when the feed claws 155 of the sprocket 154 slide on the bottom face of the base sheet (B'), the feed claws 155 move, while sliding on the base sheet (B') in light contact with it or idling, to the position of the immediately following holes (b), where the feed claws 155 engage with the holes (b) to start feeding the base sheet (B').

The above makes the cassette 100 setting further easy and certain, and prevents the feed claws 155 from unreasonably catching on the base sheet (B') in case that the feed claws 155 do not engage with the holes (b), keeping the base sheet (B') from possibly being broken or otherwise damaged.

Although the aforementioned side plates 131, 131 are illustrated (in FIG. 16) to be formed as molded integrally with the sheet receiving plate 130, the side plates 131, 131 may be separated from the receiving plate 130 and detachably fixed to the receiving plate 130 or case body 101.

Figure 21:
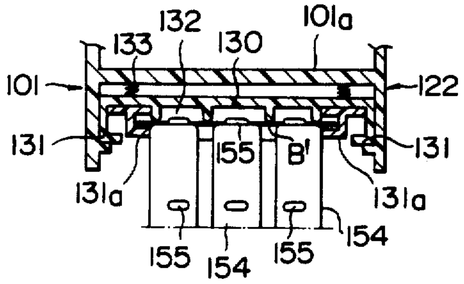
FIG. 21 is a sectional view of another embodiment of the sheet accepting member.

In case that the side plates are detachably fixed to the receiving plate or case body, other thing with which the space between the two side plates is increased or decreased may be provided for applicability to a base sheet (B') of different width. FIG. 21 shows the constructing of the side plates 131 integrally projecting from the sheet receiving plate 130 and the auxiliary side plates 131*a* which are formed of different members and detachably fixed to the inside of the side plates 131 in order to decrease the space between the side plates.

The above-mentioned auxiliary side plates 131*a* may arbitrarily be provided on the inner side of the side plates 131 of the receiving plates 130 shown in FIG. 16 and may also arbitrarily be detachably fixed to either receiving plate 130 or case body 101.

Figure 22:
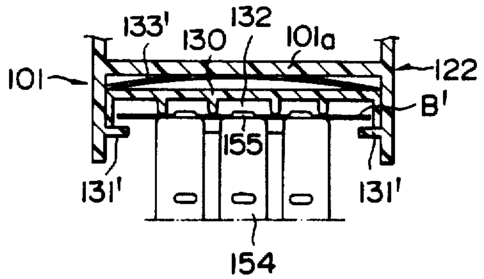
FIG. 22 is a sectional view of a still another embodiment of the sheet accepting member.
Figure 23:
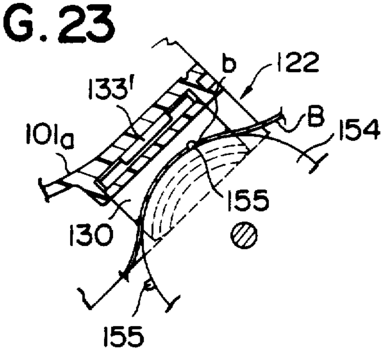
FIG. 23 is a side view of the sheet accepting member.
Figure 24:
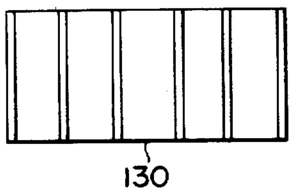
FIG. 24 is a bottom view of the sheet accepting member shown in FIG. 22.

FIGS. 22 to 24 show an example construction of the side plates 131′ which are formed integrally with the case body 101 and with which a leaf (plate) spring 133′ is used instead of the aforementioned coiled springs 133. The above spring mechanism is not restricted to the coiled springs 133 and leaf spring 133′, but may also be provided by, for example, using rubber or other cushion material or letting and elastic body integrally project from the receiving plate 130 or case body 101.

Figure 25:
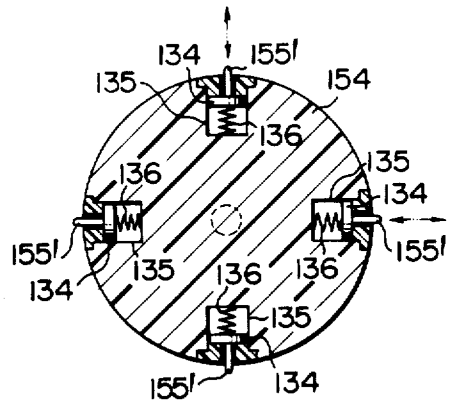
FIG. 25 is a side sectional view of a variant of a sprocket which is an embodiment of the base sheet feeder.

FIG. 25 illustrates an example construction in which the above-mentioned spring function is provided on the feed-claw side, that is, the sheet receiving member 122 is not provided with the springs 133 or spring 133′ but the receiving plate 130 is fixed and the feed claws 155′ of the sprocket 154 are provided with a spring function. As in FIG. 25, a piston head 134 is provided under the feed claw 155′, is fitted in a cylinder slot 135 and is made to be able to project by providing a coiled spring 136 inside the cylinder groove, so that the feed claw 155′ may retreat into the cylinder groove 135 when the feed claw 155′ does not engage with the hole (b) of the base sheet (B′).

Figure 27:
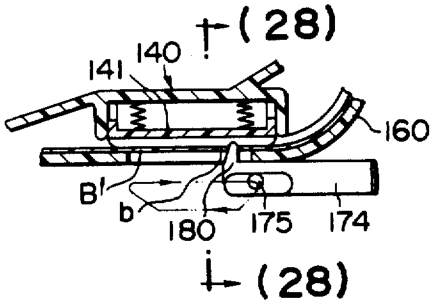
FIG. 27 is a side sectional view of the base sheet feeder.
Figure 28:
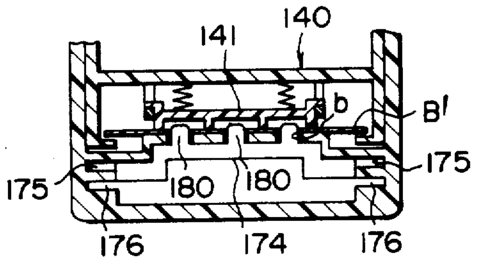
FIG. 28 is a sectional view of the feeder along the line (28)—(28) of FIG. 27.
Figure 26:
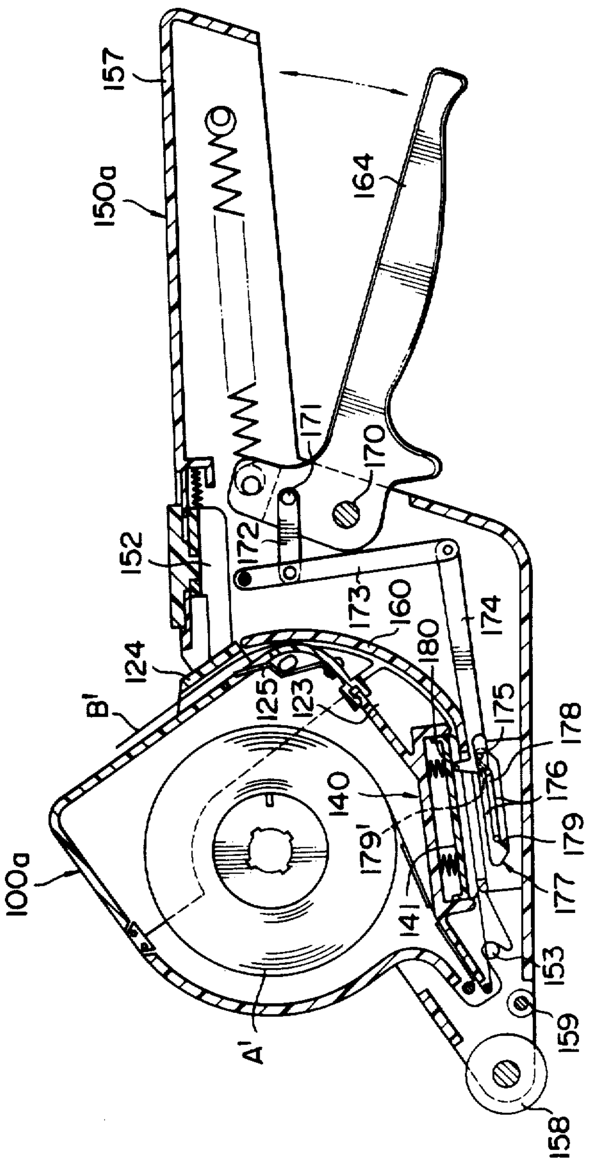
FIG. 26 is a side sectional view of a labeler provided with a variant of the base sheet feeder.

FIGS. 26 to 28 show an example modification of the base sheet feeding mechanism, in which a link mechanism is used instead of the aforementioned sprocket. For the convenience of easy understanding, the members which are identical or similar to the aforementioned members are numbered the same, and explanation of these members are omitted.

The sheet receiving member 140 of the cassette 100*a* is provided with a sheet receiving plate 141 which is in the form of a flat plate. Referring to FIG. 26, the labeler main-body 150*a* is provided with a lever fulcrum shaft 170 and link fulcrum shaft 171, which are both fixed shafts. As the lever 164 is moved up, a connecting link rod 172 moves a driving link rod 173 forward, and a feeding link rod 174 moves forward. As the lever 164 moves down, the feeding link rod 174 is moved rearward through the above rods 172 and 173.

At the tip of the above-mentioned feeding link rod 174 is a guide pin 175, which is fitted in a guide groove 176. The guide groove 176 is a long hole 177, which is sectioned up and down with a partition 178, and one end of the partition 178 is provided with a one-way stopper 179 and the other end is provided with a similar one-way stopper 179′, so that the guide pin may rotate in the clockwise direction, in FIG. 26, only. Feed claws 180 are provided at the tip of the feeding link rod 174.

As the lever 164 is moved up and down, the feed claws 180 carry the base sheet (B′) rearward; therefore, the label (C′) projects from between a sticking roller 158 and label receiving roller 159. If the feed claws 180 do not engage with the holes (b), the sheet receiving member 140 moves up, and the feed claws 180 lightly slide on the base sheet (B′) face until the feed claws 180 engage with the holes (b).

Figure 30:
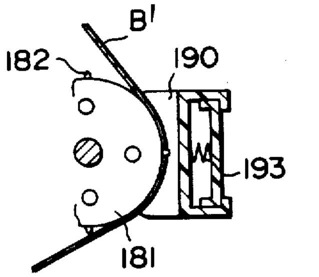
FIG. 30 is a side view of the feeder of FIG. 29.
Figure 31:
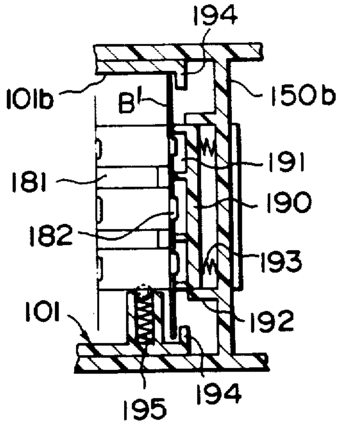
FIG. 31 is a plan view of the feeder of FIG. 30.
Figure 29:
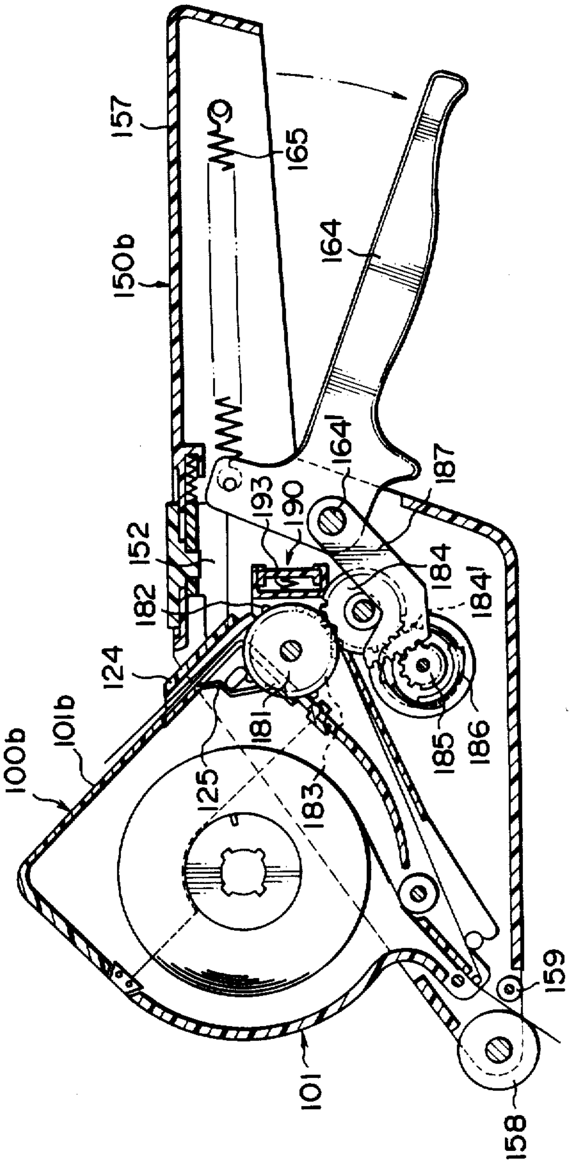
FIG. 29 is a side sectional view of the labeler provided with still another variant of the base sheet feeder.

FIGS. 29 to 31 illustrate the construction in which the aforementioned sprocket is provided in the cassette 100*b*. The cassette 100*b* has a sprocket 181, which is rotatably provided at the rear bottom, more particularly at the position of the aforementioned guide plate 123 from which the guide plate has been eliminated, of the case body 101. The base sheet (B′) is led around the sprocket 181, then to the guide frame 124.

The sprocket 181 is provided with feed claws on the circumference. The sheet receiving member 122 is omitted from the cassette 100*b*.

The labeler main-body 150*b* is provided with a sheet receiving member 190 at a position opposite to the above-mentioned sprocket 181. The sheet receiving member 190 is shaped in the form of a cylindrical surface, is provided with escape grooves 191, is provided on the labeler main-body 150*b* via coiled springs 193 and is guided with guide plates 192.

The above-mentioned sprocket 181 is provided with a driven gear 183 to be rotated by a driving gear 185 through intermediate gears 184 and 184′. To the driving gear 185, turning effort is conveyed from a driving arm 187 via a one-way clutch 186.

By moving the lever 164 up and down, the label (C′) can be projected from between the sticking roller 158 and label receiving roller 159.

Referring to FIG. 31, side plates 194 are formed on the cassette 100*b* side in order to position the base sheet (B′), and an elastic member 195 is in touch with the side face of the sprocket 181.

Figure 32:
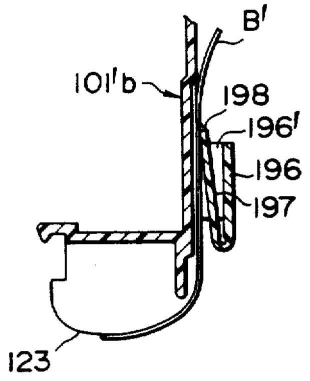
FIG. 32 is a side sectional view of the important part of a variant of a temporary stopping mechanism provided for the cassette case.
Figure 33:
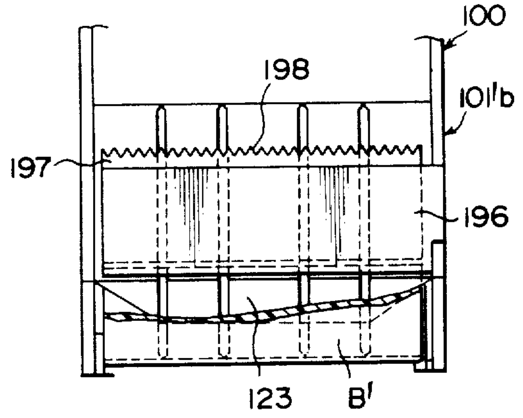
FIG. 33 is a back view of FIG. 32.
Figure 34:
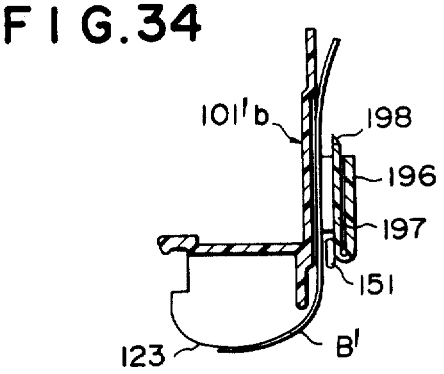
FIG. 34 is a side sectional view of stopping mechanism showing the base sheet is released from its stopped condition.
Figure 35:
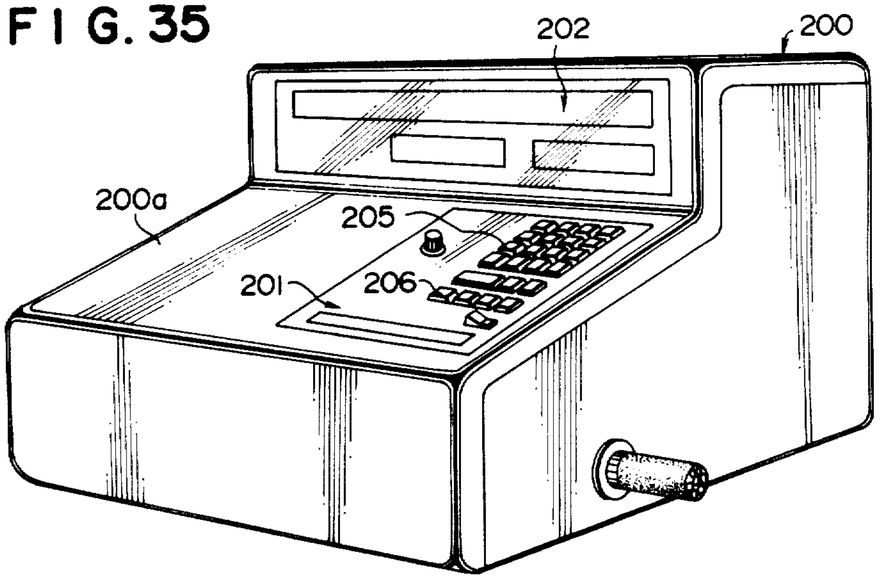
FIG. 35 is a perspective view of the label printer of the invention.
Figure 36:
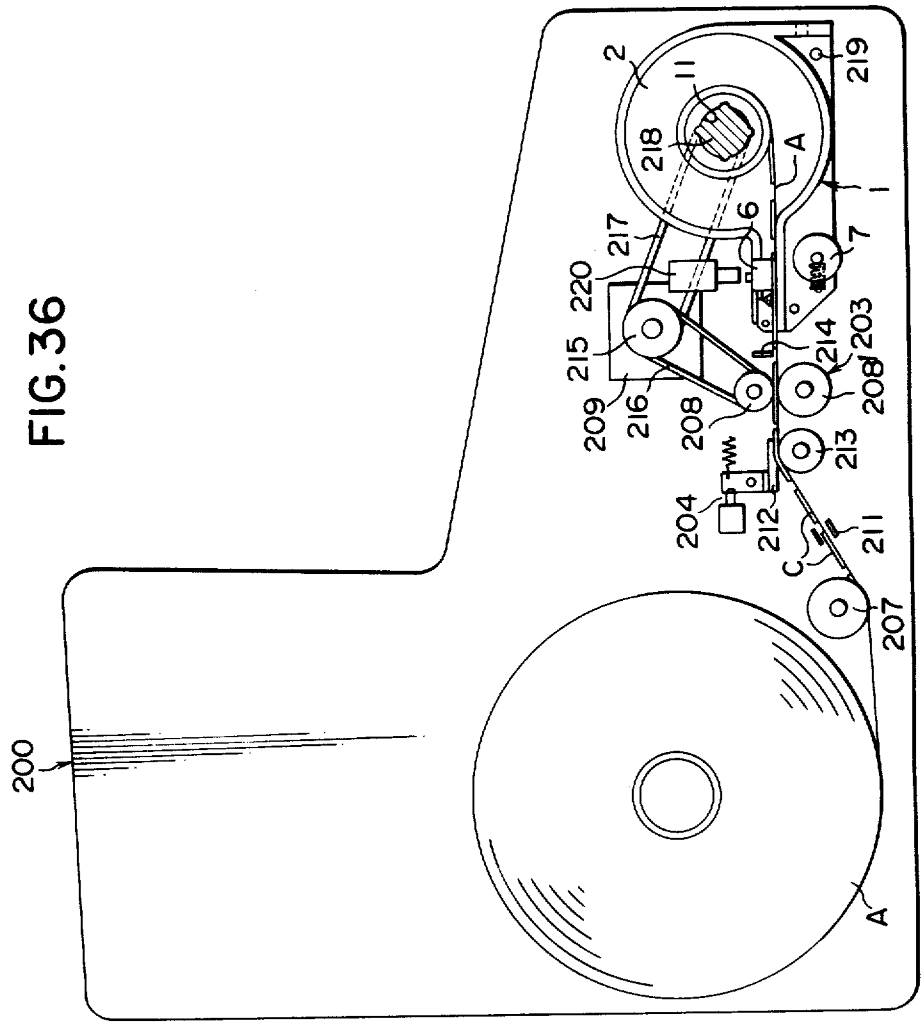
FIG. 36 is a side sectional view of the printer shown in FIG. 35.
Figure 37:
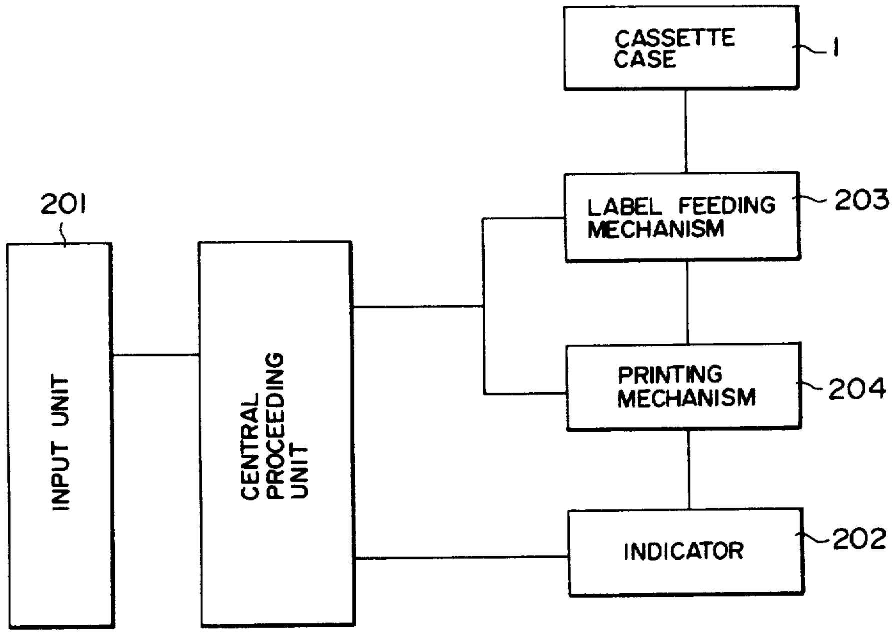
FIG. 37 is a block diagram explaining the structure of the printer.
Figure 38:
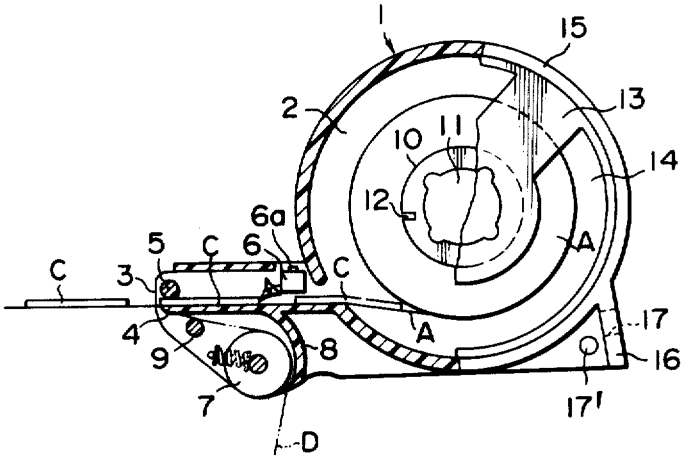

FIGS. 32 to 34 illustrate an example modification of the base sheet temporary fixer mechanism. In FIGS. 32 to 34, a fixing piece 196 is provided, either integrally with or as a separate body from the rear case 101′*b* of the cassette 100, via a lug 196′ at the rear bottom of the rear case 101′*b*, that is, at the position corresponding to the portion where the aforementioned guide frame 124 is provided.

The fixing piece 196 is shaped so as to be opposed to the approximately entire width of the rear case 101′*b* and a base sheet set plate 197 which rises toward the rear case 101′*b* side is provided at the bottom end of the fixing piece 196.

The above-mentioned set plate 197 may either be molded integrally with the fixing piece 196 or may be provided by fixing a separate member, and is fixed so as to be able to rise and fall so that the top end may touch and separate from the reaer case 101′*b*.

The set plate 197 is constructed to be a spring to energize the top end toward the rear case 101′*b*, and the top end is projected from the top end of the fixing piece 196 and is provided with a cutter 198 at the top-end edge.

The above-mentioned set plate 197 holds the base sheet (B′) between the set plate 197 and rear case 101′*b* for thereby letting the cassette 100 temporarily fixing and hold the base sheet (B′).

When the cassette 100 is set in the labeler main-body 150, the above-mentioned set plate 197 is raised by the dowel pin 151 of the main body 150 to be detached from the rear case 101′*b* for thereby releasing the base sheet (B′) from the temporarily fixed state (as in FIG. 34).

Thus, the above-mentioned rear case 101′*b* and set plate 197 compose a temporarily fixing mechanism.

Although the fixing piece 196 is illustrated as constructed to be connected to the rear case 101′*b* by means of a lug 196′ on one side, the fixing piece 196 may be constructed to be connected to the rear case on both right and left sides, and the fixing piece 196 may be cut apart in the middle.

There may also be such modifications as that one or more of the set plate 197 are formed on part or parts, for example, the center, right side and/or left side, of the fixing piece, and that the top end of the set plate 197 is formed to be below the top end of the fixing piece and the aforementioned cutter 198 is provided at the top edge of the fixing piece.

FIGS. 35 to 38 illustrate a label printer 200 to let the above-described cassette take up and store the labels that are printed, which will be explained in case that the cassette is constructed as the aforementioned cassette (1).

Referring to FIGS. 35 to 38, the label printer 200 has an input unit 201 and indicator (display) 202 flush on the front side of the cabinet 200*a*, and a central processing unit (CPU), label feeding mechanism 203 and printing mechanism 204 installed inside the cabinet. The cassette (1) to be described later is set on one side of the above-mentioned input unit 201 in the cabinet 200*a*.

The input unit 201 comprises ten-keys 205, function keys 206 and various other keys and switches. By means of the ten-keys 205 and function keys 206, a variety of necessary merchandise data, such as the name of merchandise, date of processing, expiration date of effectiveness, tare, unit price, weight, price, code numer, bar code or bar-code code system, and number of issued labels, are fed in for input of their converted signals to the central processing unit (CPU).

The data input by means of the input section 201 may alternatively be a cassette tape system due to a tape with which predetermined data are stored beforehand, a system of write with a light pen, an input system using magnetic tape or floppy disk, or other system.

The indicator or display 202 digitally displays, as connected to the central processing unit (CPU), all or part of the necessary data fed in from the input unit, a check digit, etc.

The central processing unit (CPU) is composed of a memory to store the necessary data fed in by means of the above-mentioned input unit 201 and to store the output data corresponding to necessary data, an arithmetic unit to compute the date of effectiveness expiration, the check digit, etc., and a control unit to control the operation for data transfer and the operations of the indicator 202, label feeding mechanism 203 and printing mechanism 204.

In the rear portion inside the aforementioned cabinet 200*a* is a roll of base sheet with labels (A), which is rotatably supported on a shaft. Near the reel is a guide roller 207, and in the upper front of the guide roller are a feed roller 208 and pressure roller 208' which are provided so as to be opposite each other so that the base sheet with labels (A) may be led to between the rollers 208 and 208' via the guide roller 207.

The feed roller 208 is driven by a stepping motor or other feed motor 209 to be intermittently rotated for transporting the base sheet with labels (A).

The base sheet with labels (A) is separably provided with labels (C, C, . . . ) at predetermined intervals.

On the path through which the above-mentioned base sheet (A) is transported, there is a label position detector 211 to let the above-mentioned motor 209 stop by detecting the position of a succeeding label.

The label feeding mechanism 203 is composed of the above-mentioned feed motor 209, feed roller 208, pressure roller 208' and label position detector 211.

On the base sheet (A) transporting path before the above-mentioned feed roller 208, a printing head 212 and platen roller 213 are provided at opposite positions so that the base sheet (A) may pass through between them. These printing head 212 and platen roller 213 compose the printing mechanism 204.

The printing head 212 prints the necessary data transferred to the label (C) passing under the printing head 212 by the electronic control of the central processing unit (CPU), and the printing mechanism 204 uses the printing system of, for example, thermal-head, wire-dot, ink-jet, discharge-destruction, electrostatic recording, photosensitive-recording or other dot-system printer, or type wheel system printer. Illustrated is an example of the heat-sensitive printing system (either color-developing or copy-printing type) using a thermal head.

The positional relation of the above-mentioned label feeding mechanism 203 and printing mechanism 204 in the label conveying direction may arbitrarily be reversed.

In front of the aforementioned feed roller 208, and pressure roller 208', there is a cutter 214 to cut the label base sheet (A), which cuts under the control of the central processing unit (CPU) the base sheet with labels (A) when the number of labels (C) reaches a necessary one.

Further, the aforementioned feed motor 209 is provided with a pulley 215 which integrally rotates with the motor, and the rotation of this pulley 215 is transmitted to the feed roller 208 through a belt 216 for feeding the base sheet with labels (A) intermittently and is also transmitted to a take-up shaft 218 through another belt 217. A fixing pin 219 is provided at a position a little distant from the take-up shaft 218, and a solenoid 220 to be operated with the signal for starting the issue of a needed number of labels (C) after feeding as long the base sheet with labels (A) as necessary for take-up is provided between the cutter 214 and take-up shaft 218.

After the side panel (not illustrated) of the label printer 200 is opened, the aforementioned cassette 1 is set on the take-up shaft 218 and fixing pin 219. The take-up shaft 218 is fitted in the engaging hole 11 of the supporting shaft 10 of the cassette 1.

As the input unit 201 is operated for input of a code number, price, date and other necessary data and a required number of labels to be issued, to the central processing unit (CPU), and the printer 200 is subsequently started, the input data are displayed in the display unit 202, and the check digit is automatically computed based on the input data and is displayed at the predetermined position in the display section 202. As the start switch of the function keys 206 is next operated for turning-on, the feed motor 209 starts to begin the label feed. Simultaneously, the necessary data that have been fed in are transferred from the central processing unit (CPU) to the printing section, and the printing head 212 automatically prints on the label (C) the code number, price, bar code, etc. according to the input data. The necessary data are printed on the labels (C, C, . . . ) on the base sheet in sequence by the above series of operations, and the base sheet with labels (A) is sent into the opening of the cassette 1 by means of the feed roller 208. The base sheet with labels (A) is securely wound on the supporting shaft 10 by temporarily feeding as long the base sheet with labels (A) as necessary for take-up, while labels (C) are being printed or are not printed, and stopping the feed (not in case that an automatic loading mechanism is provided) and by subsequently inserting the tip of the base sheet with labels (A) into the slit 12 of supporting shaft 10 to be held there. Thereafter, the solenoid 220 is actuated to let a reversible counter 6 display "O", the conveyance of the base sheet with labels (A) is restarted, the base sheet with labels (A) is taken up into the cassette 1 while the needed number of labels (C) are being issued, an excess length of the base sheet with labels (A) which is at least as long as the length from a separating plate 4 to a feed roller 7 (the length needed for the portion shown with a two-dot broken line in FIG. 38, and other portions) is further sent into the cassette 1, and the base sheet with labels (A) is cut by letting the cutter 214 operate interlocking with the signal of the take-up termination. At that time, the reversible counter 6 counts the needed number of labels (C) and the labels (C) which are sent as the excess. Therefore, at the time of drawing out the base sheet with labels (A) as shown with a two-dot broken line D in FIG. 38, from the cassette 1 which is removed from the label printer 200, the net number of printed labels (C) is to be secured by drawing out the base sheet with labels (A) until the indication of the reversible counter 6 counts down up to the needed number of labels.

In case that the printing mechanism 204 is a dot-system printer, a continuous pattern of straight lines or other over the whole printing elements (check pattern) may be printed on a desired number of labels (C) within the above-mentioned excess length of the base sheet with lables (A) after printing the needed number of labels (C) in order to check the performance of the printing head of the printing mechanism 204 by detecting possible discontinuous portions in the printed check patterns.

Figure 39:
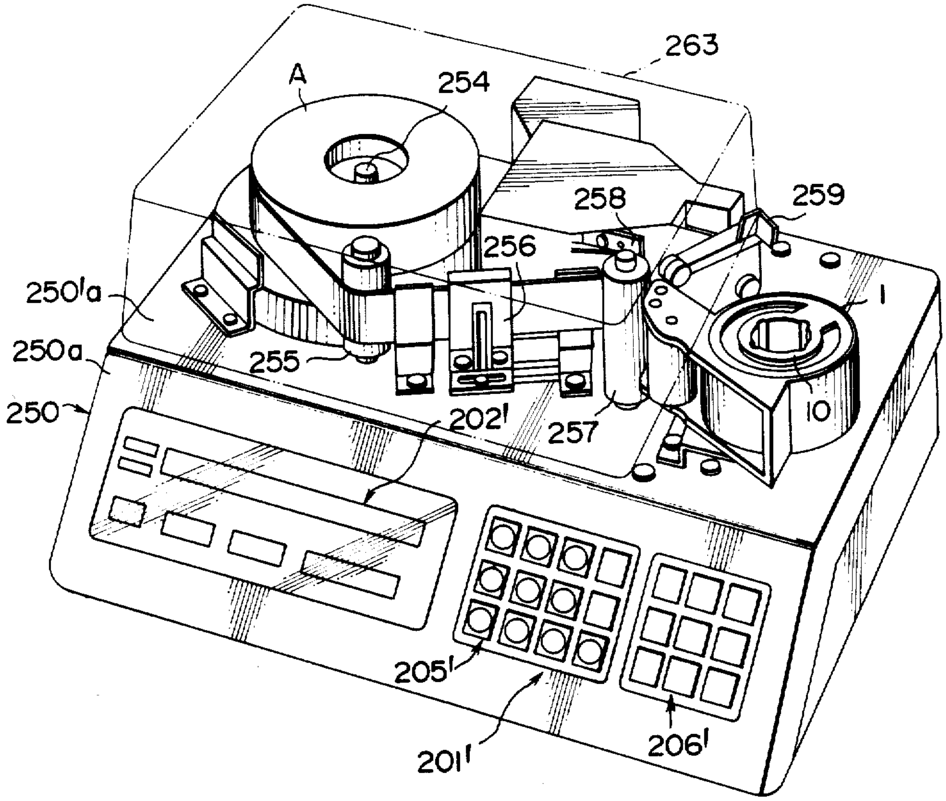
FIG. 39 is a perspective view of another embodiment of the label printer.
Figure 40:
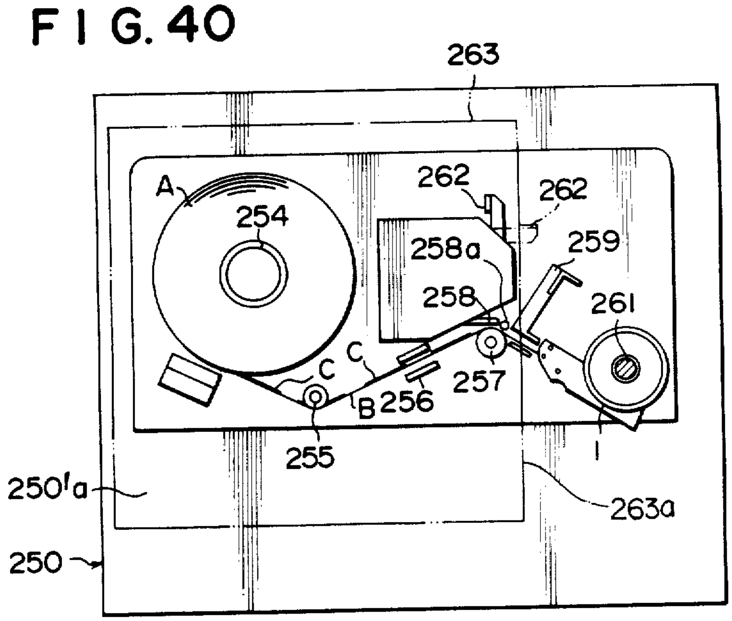
FIG. 40 is a plan view of the printer shown in FIG. 39.

The process of taking up the base sheet with printed labels and containing it in the cassette may be carried out by a label printer 250 as illustrated in FIGS. 39 and 40. The cassette shown in FIGS. 39 and 40 is similar to the aforementioned cassette 1.

The label printer 250 comprises a supply reel 254, guide roller 255, detector 256, platen roller 257, thermal head 258, auxiliary roller 258*a*, cutter 259 and take-up shaft 261 atop a cabinet 250*a* with the bottom end of each of the above members supported on the top face of the cabinet. The above-mentioned members 254, 255, 257, 258*a*, and 261 are mounted rotatable and perpendicular to a horizontal base plate 250′*a* at the top of the cabinet 250*a*.

A roll of base sheet with labels (A) is horizontally rotatably set on the above-mentioned supply reel 254, and the supporting shaft 10 of the cassette 1 is set on the take-up shaft 261 to be able to be rotated.

There is a clearance in the detector 256, between the platen roller 257 and thermal head 258, between the platen roller 257 and auxiliary roller 258*a* and in the cutter 259, respectively, in order to let the base sheet with labels (A) pass through, and these clearances are open at the top in order to let the base sheet with labels (A) be inserted there in the lateral direction of the base sheet.

The thermal head 258 and auxiliary roller 258*a* are provided so as to be touched to and separated from the platen roller 257 by the operations of the lever 262.

The reference number "263" denotes a transparent hollow cover which ocvers the aforementioned members 254, 255, 256 and 257 and thermal head 258 and is provided with an opening to draw out the base sheet (A) on the right side 263*a* in FIG. 40. Therefore, the base sheet (A) supplied from the supply reel 254 is sent past the guide roller 255 and lable feed detector 256 to between the platen roller 257 and the thermal head 258 and auxiliary roller 258*a*, and, after necessary data are printed on the label by means of the thermal head 258, the base sheet (A) passes the cutter 259 and is taken up on the supporting shaft 10 of the cassette 1 to be contained in the cassette 1.

In FIG. 39, an input unit 201′, a display or indicator 202′, ten-keys 205′ and function keys 206′ are also shown.

I claim:

1. A cassette case adapted to be used with a labeler body having a drive roller, wherein said cassette case comprises a case body comprising:

(a) an outlet opening;

(b) a labelled base sheet having at least one label on a base sheet and stored in a roll form in said case body, wherein said labelled base sheet is adapted to be extracted through said outlet;

(c) a peeling member positioned near said opening for curving said labelled base sheet to the rear so as to peel off each said label from the base sheet to provide a peeled-off base sheet;

(d) guide means disposed rearward of said peeling member and a feed roller for feeding the peeled-off base sheet in a predetermined direction, wherein said guide means comprises a curved base adapted to cooperate with said drive roller on said labeler body for moving said base sheet through said cassette case such that said base sheet is disposed between said feed roller and said guide members; and (e) means for elastically pressing said feed roller against said guide means to maintain said backing sheet between said guide means and said feed roller.

2. The cassette case defined by claim 1, wherein the peeling member is a peeling plate formed integrally with the case body.

3. The cassette case defined by claim 1, wherein the peeling member is a peeling shaft.

4. The cassette case defined by claim 1 wherein the peeling member is a peeling plate formed separately from the case body.

5. A cassette type labeler comprising:

(a) a labeler body; and (b) a cassette case adapted to be attached to said labeler body, comprising:

(i) a base sheet adapted to move through said labeler;

(ii) at least one printed label on said base sheet;

(iii) an outlet;

(iv) a peeling member at said outlet for peeling each said printed label off from said base sheet; and (v) stopping means for selectively preventing movement of said base sheet through said labeler, wherein said labeler body intermittently feeds said base sheet through said labeler, said labeler further comprising feed claws and said base sheet being provided with holes at constantly spaced intervals which are adapted to engage said feed claws in order to feed said sheet intermittently, said labeler further comprising a sheet receiving member positioned to face said feed claws for guiding said label-peeled base sheet between said sheet receiving member and said feed claws wherein one of said sheet receiving member and said feed claws comprises a spring mechanism for biasing one of said sheet receiving member and said feed claws toward the other of said sheet receiving member and said feed claws.

6. The labeler defined by claim 5, wherein said cassette case comprises said sheet receiving member and said labeler body comprises said feed claws.

7. The labeler defined by claim 6, wherein said labeler body further comprises a rotatably mounted sprocket, wherein the feed claws are claws formed at the circumference of said sprocket.

8. The labeler defined by claim 6, wherein said labeler further comprises a reciprocating link rod, wherein the feed claws are claws formed on said link rod.

9. The labeler defined by any one of claims 6 through 8, wherein the sheet receiving member comprises: a sheet receiving plate adapted to receive and slide on the base sheet; and a first pair of side plates to guide both ends of the sheet so as to properly position the sheet.

10. The labeler defined by claim 9, wherein said receiving plate and said side plates are molded integrally with each other.

11. The labeler defined by claim 10, wherein said labeler further comprises a second pair of side plates narrower than said first pair of side plates, wherein said second pair of side plates are removably provided within said first pair of side plates.

12. The labeler defined by claim 9 wherein said side plates are molded separately from said sheet receiving member.

13. The labeler defined by claim 12, wherein said pair of side plates are adapted to be exchanged for another pair of side plate which have different width.

14. The labeler defined by claim 12 wherein said side plates are detachable from said labeler, and wherein said labeler is adapted to receive side plates of different widths.

15. The labeler defined by claim 12 wherein said sheet receiving member further comprises a second pair of side plates, narrower than said first pair of side plates, wherein said second pair of side plates are removable attached within said first pair of side plates.

16. The labeler defined by claim 8 wherein said labeler body further comprises a lever pivotably attached to said labeler body, and connected to said link rod, wherein pivoting of said lever toward said labeler body reciprocates said link rod.

17. The labeler defined by claim 16 wherein said labeler body further comprises:

a connecting link rod attached to said lever;

a driving link rod attached to said connecting link rod, and said reciprocating link rod, wherein when said lever pivots toward said labeler body, said lever displaces said connecting link rod, said connecting link rod displaces said driving link rod, and said driving link rod displaces said reciprocating link rod.

18. The labeler defined by claim 5, wherein said labeler body comprises said sheet receiving member, and said cassette case comprises said feed claws.

19. The labeler defined by claim 18 wherein said cassette case further comprises a rotatably mounted sprocket thereon, wherein said feed claws are claws formed on the circumference of said sprocket.

20. The labeler defined by claim 19 wherein said labeler body further comprises a lever pivotally connected to said labeler body; a driving arm attached to said lever; a one-way clutch adapted to engage said driving arm; a driving gear, driven by said driving arm; an intermediate gear driven by said driving gear and adapted to engage a gear on said sprocket for driving said sprocket in response to pivoting of said lever.

21. The labeler defined by claim 19 wherein said cassette case further comprises:

a rear wall;

a fixing piece spaced from said rear wall;

a base sheet set plate having first and second ends and attached at said first end to the bottom end of said fixing piece and wherein said second end is biased against said rear wall, when said cassette case is unattached to said labeler body, and wherein said base sheet is disposed between said base sheet set plate and said rear wall whereby said base sheet set plate biases said base sheet against said rear wall.

22. The labeler defined by claim 21 wherein said labeler body further comprises a dowel pin which raises said base sheet set plate away from said base sheet and said rear wall when said cassette case is attached to said labeler body.

23. The labeler defined by claim 5 wherein said cassette case further comprises guide means for guiding said base sheet as said base sheet moves rearward from said peeling member, and wherein said guide means comprises said stopping means.

24. The labeler defined by claim 23 wherein said labeler body further comprises:

(a) a lever, pivotably mounted on said labeler body;

(b) a driving roller for driving said base sheet through said labeler; and (c) ratchet means for transmitting pivoting of said lever in one direction toward said body into movement of said driving roller.

25. The labeler defined by claim 23 wherein said stopping means prevents movement of said base sheet when said cassette case is unattached to said labeler body, and said stopping means permits movement of said base sheet when said cassette case is attached to said labeler body.

26. The labeler defined by claim 25 wherein said base sheet has openings therein and wherein said labeler further comprises a rotatably mounted sprocket having feed claws thereon, each of which is adapted to engage one of said openings in said base sheet, and wherein said cassette case further comprises a sheet receiving member, wherein said base sheet is adapted to travel between said sheet receiving member and said sprocket, wherein said sprocket further comprises elastic means for biasing said feed claws toward said sheet receiving member, and wherein each feed claw is biased such that each feed claw is displaced away from said base sheet when said feed claw contacts said base sheet between said openings.

27. The labeler defined by claim 25 wherein said base sheet has openings therein and wherein said labeler further comprises a rotatably mounted sprocket having feed claws thereon, each of which is adapted to engage said openings in said base sheet, and wherein said cassette case further comprises a sheet receiving member wherein said base sheet travels between said sheet receiving member and said sprocket, and wherein said sheet receiving member further comprises elastic means for biasing said sheet receiving means into contact with said base sheet.

28. The labeler defined by claim 27 wherein said sheet receiving member is displaced away from said sprocket in response to said feed claws contacting said base sheet between said openings.

29. The labeler defined by claim 25 wherein said guide means further comprises: a guide frame spaced from a rear wall of said cassette case, wherein said base sheet is adapted to travel between said rear wall of said cassette case and said guide frame.

30. The labeler defined by claim 29 wherein said rear wall of said cassette case has a first opening therein and said cassette case further comprises a sheet set plate, extending through said first opening to press said base sheet against said guide frame to selectively prevent movement of said base sheet.

31. The labeler defined by claim 30 wherein said sheet set plate comprises a plate spring, so that said sheet set plate is biased into contact with said base sheet whereby said base sheet is pressed against said guide frame when said cassette case is unattached to said labeler body.

32. The labeler defined by claim 31 wherein said cassette case comprises a second opening therein and said sheet set plate comprises a push arm on the interior of said cassette case, over said second opening, and wherein said labeler body further comprises a knock pin, wherein, when said cassette case is attached to said labeler body, said knock pin extends through said second opening to raise said sheet set plate off said base sheet.

33. The labeler defined by claim 29 wherein said guide frame is integral with said cassette case and comprises a window therein and wherein cassette case further comprises a bottom rear wall extending into said window to contact said base sheet and to press said base sheet against said guide frame, wherein said bottom rear wall extending into said window is a sheet set plate.

34. The labeler defined by claim 33 wherein said sheet set plate comprises a leaf spring so that said sheet set plate is biased against said base sheet.

35. The labeler defined by claim 34 wherein said labeler body comprises a knock pin and said sheet set plate comprises a recess therein, wherein said sheet set plate is adapted to pivot around set recess and off said base sheet in response to contact with said knock pin when said cassette case is attached to said labeler body.

36. A cassette case which is adapted to be attached to a labeler body, said cassette case comprising:

(a) an outlet;

(b) a labelled base sheet comprising a base sheet and at least one printed label attached to said base sheet, wherein said labelled base sheet is in the form of a roll and wherein said roll is adapted to be unwound and extracted through said outlet;

(c) a peeling member positioned near said outlet for peeling off each said label from said base sheet by curving said base sheet rearward to produce a label peeled base sheet; and (d) guide means for guiding said base sheet through said cassette case, wherein said guide means comprises stopping means for selectively preventing movement of said base sheet, at least one of said labeler and said cassette case further comprising feed claws and wherein said base sheet is provided with holes at constantly spaced intervals, said holes being adapted to be engaged by said feed claws in order to feed said sheet intermittently, said labeler further comprising a sheet receiving member positioned to face said feed claws when said cassette case is attached to said labeler for guiding said label-peeled base sheet between said sheet receiving member and said feed claws comprises a spring mechanism for biasing one of said sheet receiving member and said feed claws toward the other of said sheet receiving member and said feed claws.

37. The cassette case defined by claim 36 wherein said stopping means comprises: a guide frame through which the base sheet passes and which is provided on said cassette case; and a base-sheet set plate elastically biased toward said guide frame; and wherein said set plate is adapted to be displaced toward and away from said guide frame and wherein the guide frame and the set plate are adapted to cooperate to stop movement of the base sheet.

38. The cassette case defined by claim 37, wherein the guide frame comprises a window into which the end of the set plate projects, wherein the set plate and the window, are adapted to cooperate to hold the base sheet.

39. The cassette case defined by claim 37, wherein said case further comprises a cutter integral with the upper margin of the guide frame, so as to cut the sheet.

40. The cassette case defined by claim 37; wherein said case further comprises a cutter integral with the upper margin of the base sheet set plate, so as to cut the sheet.

41. The cassette case defined by claim 37 wherein said case further comprises a cutter separate from the upper margin of said guide frame, so as to cut said base sheet.

42. The cassette case defined by claim 32 further comprising a cutter separate from the upper margin of said basesheet set plate, so as to cut said sheet.

43. The cassette case defined by claim 36 further comprising a sprocket rotatingly mounted to said cassette case; wherein said sprocket comprises said feed claws and wherein said label-peeled base sheet is wound around said sprocket so as to be introduced to said stopping means.

44. The cassette case defined by claim 36 wherein the peeling member is a peeling plate formed integrally with said cassette case.

45. The cassette case defined by claim 36 wherein the peeling member is a peeling shaft.

46. The cassette case defined by claim 36 wherein said stopping means prevents movement of said base sheet when said cassette case is unattached to said labeler body, and said stopping means permits movement of said base sheet when said cassette case is attached to said labeler body.

47. The cassette case defined by claim 36 wherein said guide means further comprises a guide frame spaced from a rear wall of said cassettte case, wherein said base sheet is adapted to travel between said rear wall of said cassette case and said guide frame.

48. The cassette case defined by claim 47 wherein said rear wall of said cassette case has a first opening therein and said cassette case further comprises a sheet set plate, extending through said first opening to press said base sheet against said guide frame to selectively prevent movement of said base sheet.

49. The cassette case defined by claim 48 wherein said sheet set plate comprises a plate spring, so that said sheet set plate is biased into contact with said base sheet whereby said base sheet is pressed against said guide frame when said cassette case is unattached to said labeler body.

50. The cassette case defined by claim 49 wherein said cassette case comprises a second opening therein and said sheet set plate comprises a push arm on the interior of said cassette case, over said opening, and wherein said labeler body further comprises a knock pin, wherein, when said cassette case is attached to said labeler body, said knock pin extends through said second opening to raise said sheet set plate off said base sheet.

51. The cassette case defined by claim 47 wherein said guide frame is integral with said cassette case and comprises a window therein and wherein said cassette case further comprises a bottom rear wall extending into said window to contact said base sheet and press said base sheet against said guide frame, wherein said bottom rear wall extending into said window is a sheet set plate.

52. The cassette case defined by claim 51 wherein said sheet set plate comprises a leaf spring so that said sheet set plate is biased against said base sheet.

53. The cassette case defined by claim 52 wherein said labeler body comprises a knock pin and said sheet set plate comprises a recess therein, wherein said sheet set plate is adapted to pivot around set recess and off said base sheet in response to contact with said knock pin when said cassette case is attached to said labeler body.

54. The cassette case defined by claim 36 wherein said guide means comprises a sheet receiving member for guiding said label-peeled base sheet, which slides thereon, wherein said sheet receiving member comprises a spring mechanism for biasing said sheet receiving member toward the base sheet.

55. The cassette case defined by claim 54 wherein said stopping means is positioned rearward of the sheet receiving member.

56. The cassette case defined by claim 55 wherein said cassette case has a rear side and a bottom and wherein said stopping means is positioned at said rear side of said cassette case, and wherein said base sheet is curved rearward of the peeling member and fed along said bottom of said cassette case, to the rear side of the case body and then to the stopping means.

57. The cassette case defined by claim 54 wherein the sheet receiving member comprises a sheet receiving plate for receiving the base sheet, which slides thereon; and a first pair of side plates for guiding both ends of the base sheet so as to properly position the sheet in said cassette case.

58. The cassette case defined by claim 57 wherein said sheet receiving plate and said side plates are integral with each other.

59. The cassette case defined by claim 57 wherein the sheet receiving plate and side plates are formed separately from each other.

60. The cassette case defined by claim 59 wherein said pair of side plates, are adapted to be exchanged for another pair of side plates having a different width.

61. The cassette case defined by claim 59 further comprising a second pair of side plates narrower than said first pair of side plates, wherein said second pair of side plates are removably mounted within said first pair of side plates.

* * * * *

UNITED STATES PATENT AND TRADEMARK OFFICE
CERTIFICATE OF CORRECTION

PATENT NO. : 4,578,140

DATED : March 25, 1986

INVENTOR(S) : Toshio NAKAJIMA

It is certified that error appears in the above-identified patent and that said Letters Patent is hereby corrected as shown below:

The Abstract should read as follows:

---An easy-to-use labeller, also called a price gun, label gun, pricer, or labeller, that can be used to fasten labels containing information on prices, commodity names, dates, etc., to food articles and clothes by workers at supermarkets and department stores, for example. The labeller includes a cassette case which stores labels, a label printer for printing labels, and a labeller body to which the cassette case is mounted to intermittently feed the labels.---

Rather than:

"A novel handy labeller, and more particularly a handy machine for labelling, is provided, which is called also as a price gun, label gun, pricer or labeller, and is used to fasten labels containing information in prices, commodity names, dates, etc., to food articles and clothes, by workers at supermarkets, department stores and so on. Further, there are provided a cassette case which stores labels, and a label printer for printing labels and for winding and housing base sheets to which printed label is affixed, in the cassette case."

UNITED STATES PATENT AND TRADEMARK OFFICE
CERTIFICATE OF CORRECTION

PATENT NO. : 4,578,140

DATED : March 25, 1986

INVENTOR(S) : Toshio NAKAJIMA

It is certified that error appears in the above-identified patent and that said Letters Patent is hereby corrected as shown below:

At column 17, line 31 (in claim 13, line 3), "plate" should be ---plates--- and ---a--- should be inserted after "have".

At column 17, line 39, "removable" should be ---removably--- (in claim 15, line 4).

At column 20, line 15 (claim 38, line 4), "," should be deleted.

At column 22, line 24 of the printed patent (claim 60, line 2), "," should be deleted.

At column 19, line 28 (claim 33, line 3), after "wherein", insert ---said---.

Signed and Sealed this

Twenty-eighth Day of April, 1987

*Attest:*

DONALD J. QUIGG

*Attesting Officer*

*Commissioner of Patents and Trademarks*